United States Patent
Hamada et al.

(10) Patent No.: US 6,924,060 B2
(45) Date of Patent: Aug. 2, 2005

(54) PRISMATIC SEALED BATTERY MODULE

(75) Inventors: Shinji Hamada, Toyohashi (JP); Takashi Asahina, Toyohashi (JP); Toyohiko Eto, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 429 days.

(21) Appl. No.: 10/213,811

(22) Filed: Aug. 6, 2002

(65) Prior Publication Data

US 2003/0027041 A1 Feb. 6, 2003

(30) Foreign Application Priority Data

Aug. 6, 2001 (JP) ........................................ 2001-237754

(51) Int. Cl.$^7$ ............................................... H01M 2/00
(52) U.S. Cl. ....................... 429/163; 429/149; 429/153; 429/167
(58) Field of Search ................................ 429/149, 153, 429/163, 167

(56) References Cited

U.S. PATENT DOCUMENTS 6,304,057 B1 * 10/2001 Hamada et al. ............. 320/107

2001/0007728 A1 * 7/2001 Ogata et al. ................. 429/120
2003/0027040 A1 * 2/2003 Asahina et al. .............. 429/159

FOREIGN PATENT DOCUMENTS

JP 2001-093503 4/2001

* cited by examiner

Primary Examiner—Dah-Wei Yuan
(74) Attorney, Agent, or Firm—Jordan and Hamburg LLP (57) ABSTRACT

In a prismatic sealed battery module which includes a plurality of electrode plate groups, collectors joined to leads on both sides of the electrode plate group, and a prismatic battery case for storing the plurality of electrode plate groups, a connected-electrode-plate-group body is constituted by connecting the plurality of electrode groups with collectors interposed between them. A sheet covering both side surfaces and a bottom surface of the peripheral surfaces of the connected-electrode-plate-group body is provided. After gaps between the sheet and outer edges of the collectors are sealed, the connected-electrode-plate-group body is placed in the prismatic battery case. Thereby, the current-carrying paths between the electrode plate groups are short and straight, resulting in reduced internal resistance. A battery case for the individual cell is constituted such that gaps between outer edges of the collectors which are not sealed to the sheet, and the inner surfaces of the prismatic battery case are sealed.

11 Claims, 8 Drawing Sheets

PRISMATIC SEALED BATTERY MODULE

The present disclosure relates to subject matter contained in priority Japanese Patent Application No. 2001-237754, filed on Aug. 6, 2001, the contents of which is herein expressly incorporated by reference in its entirety.

BACKGROUND OF THE INVENTION

1. Field of the Invention

The present invention relates to a prismatic sealed battery module, and particularly relates to a prismatic sealed battery module which is formed by connecting a plurality of cells, and has a decreased internal resistance.

2. Description of Related Art

A conventional rechargeable battery module can provide a required electric power capacity by connecting a plurality of cells. This battery module is constituted such that a plurality of prismatic cells are placed while longer side surfaces of their cell case are opposingly brought into contact with each other, end plates are provided outside of the cell cases on both the ends, and the cells are integrally connected by binding with a tie band. Leads are pulled out upward from the top ends of electrode plates in the individual cells. The leads are connected with terminals provided on a cover of the cell case, and then the terminals between the cells are connected with each other through connection plates.

As a result, since connection paths between the cells are long, and the number of connection points is large, resistance caused by constitution parts including connection parts becomes high. A ratio of this part resistance to a reaction resistance caused by a battery reaction among a positive electrode plate, a negative electrode plate, and electrolyte reaches 40:60 to 50:50. Since this large internal resistance increases heat generation, increasing the output and enhancing life characteristics are seriously obstructed. Since the connection constitution between the cells is complicated, and the number of the parts is large, the cost also increases.

Figure 10:
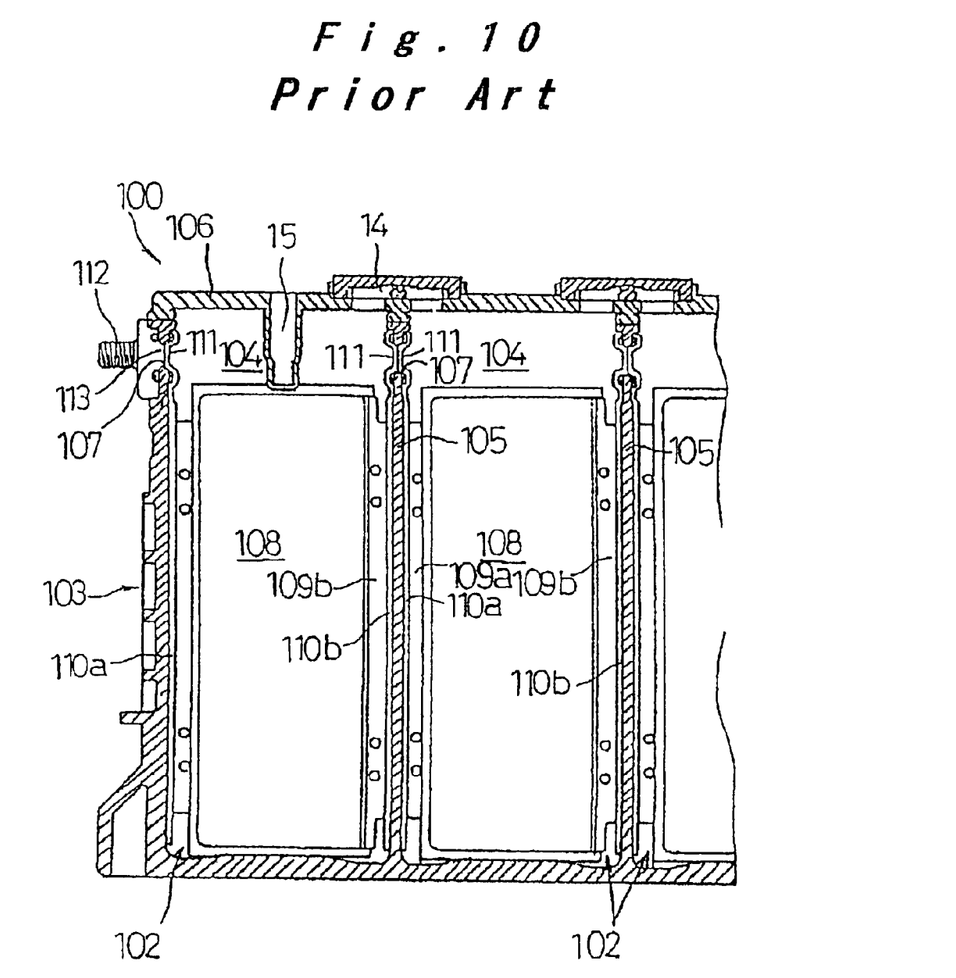
FIG. 10 is a partial longitudinal sectional view of a conventional prismatic sealed battery module.
Figure 11:
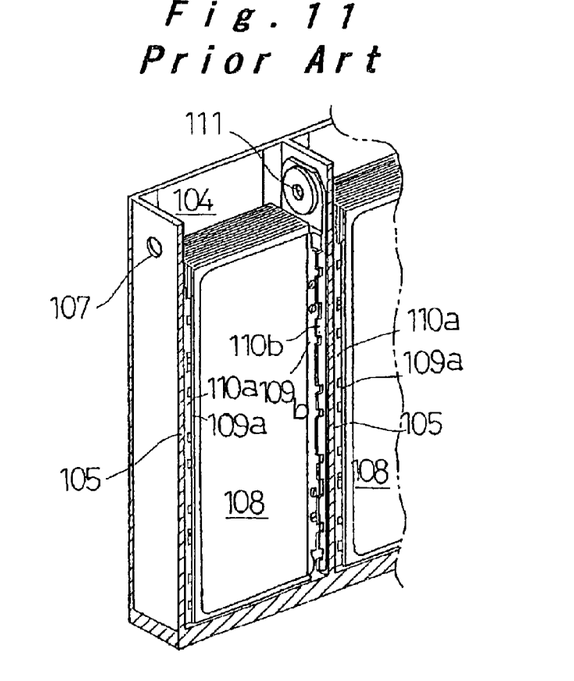
FIG. 11 is a perspective view showing a partially broken battery case of the conventional battery module.

In light of the foregoing, the present applicant proposed a prismatic sealed battery module 100 including a plurality of cells 102 as shown in FIG. 10 and FIG. 11. The reference numeral 103 denotes a prismatic battery case which is formed as a flat rectangular solid. This battery case is constituted by integrally connecting a plurality of cell cases 104 used for the cells 102 formed as a prismatic shape including short side surfaces and long side surfaces while the short side surface is mutually shared as a partition wall 105. Openings on the top surface of the cell cases 104 are closed by a single cover 106. Connection holes 107 are formed on an upper part of the outside short side surfaces of the cell cases 104 on both the ends, and on an upper part of the partition walls 105 between the cell cases 104. The individual cell cases 104 store an electrode plate group 108 and electrolyte. The electrode plate group 108 is constituted by laminating a rectangular positive electrode plate and a rectangular negative electrode plate with a separator interposed between them. Consequently, the cell 102 is formed. The positive electrode plate and the negative electrode plate of the electrode plate group 108 protrude from the sides opposite to each other to form leads 109a and 109b for the positive electrode plate and the negative electrode plate. Collectors 110a and 110b are respectively connected with the side edges of the leads 109a and 109b by welding.

A connection protrusion 111 to be fit into the connection hole 107 is protrudingly formed at an upper part of the collectors 110a and 110b. The connection protrusions 111 of the positive and negative collectors 110a and 110b are connected with each other by welding between the neighboring cell cases 104. Positive and negative connection terminals 112 are also installed into the connection holes 107 on the outer short side surface of the cell cases 104 on both the ends. Then, a connection protrusion 113 of the connection terminal 112 and the connection protrusion 111 of the collector 110a or 110b are connected with each other by welding. Consequently, the plurality of cells 102 stored in the prismatic battery case 103 are connected serially, and a power is provided between the connection terminals 112 on both the ends.

Figure 12:
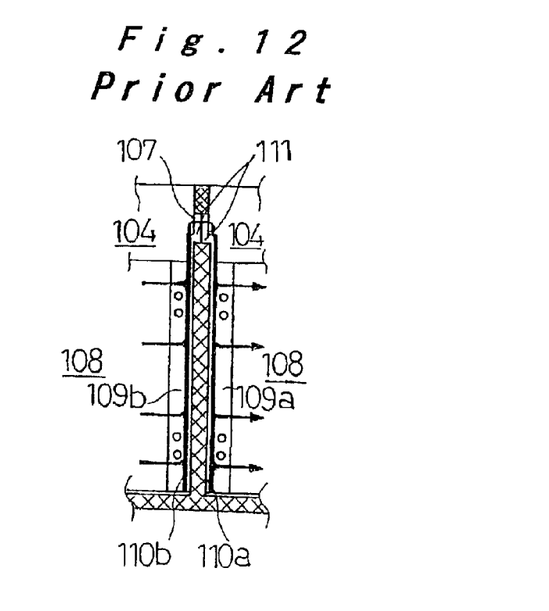
FIG. 12 is an explanatory drawing of current-carrying paths of the conventional battery module.

With the constitution shown in FIG. 10 and FIG. 11, the current-carrying paths from the positive electrode plate and the negative electrode plate to the respective leads 109a and 109b, and the respective collectors 110a and 110b are short. However, since tips of the connection protrusions 111 on the top end of the collectors 110a and 110b are connected with each other at the one point by welding, the connection path is detoured, thereby increasing the length of the connection paths, and simultaneously the connection point is one as arrows in FIG. 12 show. Consequently, the internal resistance increases.

SUMMARY OF THE INVENTION

In light of the foregoing, an object of the present invention is to provide a prismatic sealed battery module for further decreasing the internal resistance per cell, thereby increasing the output.

A prismatic sealed battery module of the present invention includes a plurality of electrode plate groups each of which is formed by laminating a positive electrode plate and a negative electrode plate with a separator interposed between them, leads protruding respectively from one side of the positive electrode plate and the negative electrode plate in directions opposite to each other, collectors joined to the leads on both sides of the electrode plate group, and a prismatic battery case for storing the plurality of electrode plate groups. A connected-electrode-plate-group body is constituted by connecting the plurality of electrode plate groups with each other with the collectors interposed between them. Then, the connected-electrode-plate-group body is placed in the prismatic battery case while a sheet covering at least two side surfaces of peripheral surfaces of the connected-electrode-plate-group body is provided, and simultaneously gaps between the sheet and outer edges of the collectors are sealed. Finally, gaps between outer edges of the collectors which are not sealed to the sheet, and the inner surfaces of the prismatic battery case are sealed. Since the connected-electrode-plate-group body is constituted such that the electrode plate groups serving as a power generation element for the cells are connected with each other through the leads on both the sides and the collectors, the current-carrying paths between the cells are short and straight, and thus the internal resistance is reduced. As a result, the internal resistance per cell is reduced further accordingly, resulting in increasing the output. In addition, since the battery case for the cell is formed by the collectors and the sheet provided independently to the prismatic battery case, it is possible to secure electrolyte seal between the battery cases even when the side walls of the prismatic battery case move due to expansion and contraction of the cells.

The connected-electrode-plate-group body may be constituted such that the collectors are joined to the leads on both the sides of the electrode plate group, and simultaneously the collectors are joined to each other, or the leads are inserted into and connected with individual fold-back recesses of a corrugated collector formed by folding the collector into waveform.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 8A and 8B show another variation of the principal part of the prismatic sealed battery module according to the embodiment, wherein FIG. 8A is a transverse sectional view, and FIG. 8B is a perspective view of a part of a sheet;

DETAILED DESCRIPTION OF THE PREFERRED EMBODIMENTS (First Embodiment)

A first embodiment of a prismatic sealed battery module of the present invention will be described referring to FIG. 1 to FIG. 4.

Figure 1:
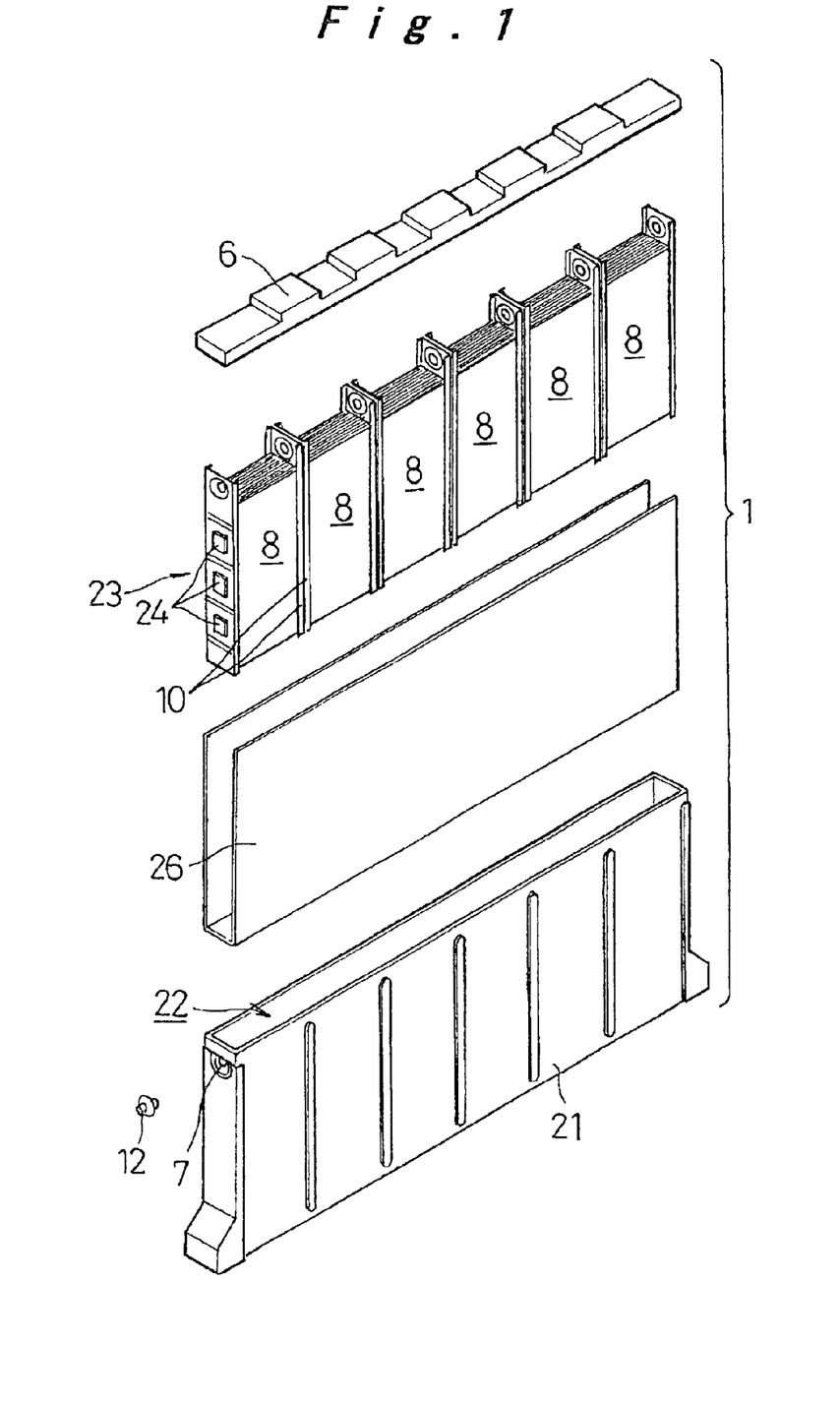
FIG. 1 is an exploded perspective view of a prismatic sealed battery module according to a first embodiment of the present invention.

In FIG. 1, a prismatic battery case 21 of a prismatic sealed battery module 1 of the present embodiment is constituted as a flat horizontally oblong box. The case includes a storage space 22 for storing a connected-electrode-plate-group body 23. The connected-electrode-plate-group body 23 is formed by connecting a plurality of (six in the drawing) prismatic electrode plate groups 8, which include short side surfaces and long side surfaces, with each other, with collectors 10 joined to the short side surfaces on both the sides of the individual electrode plate group 8. Connection holes 7 for installing and connecting connection terminals 12 are formed at a top part of both end walls of the prismatic battery case 21. An opening of the top surface of this prismatic battery case 21 is constituted so as to be sealed by welding a single cover 6.

The electrode plate group 8 is constituted such that a plurality of positive electrode plates and negative electrode plates are alternately laminated with separators interposed between them. This is achieved by covering the individual positive electrode plates with the separator having a bag-shape and an opening in the widthwise direction, and stacking the positive electrode plates and negative electrode plates alternately. The positive electrode plate is constituted by filling Ni foamed metal excluding a part corresponding to a lead 9 with nickel hydroxide. The lead 9 of the positive electrode plate is constituted by compressing the foamed metal and ultrasonic-seam welding a lead plate on one surface. The negative electrode plate is constituted by applying a negative electrode material including hydrogen-absorption alloy to Ni punched metal excluding a part corresponding to a lead.

In the electrode plate group 8, the leads of the positive electrode plates and the negative electrode plates protrude in directions opposite to each other. The collectors 10 are joined to these leads, respectively. The collectors 10 joined to the electrode plate group 8 (the electrode plate group 8 including the collectors 10 is simply referred to as electrode plate group 8 hereafter) are joined to each other, thereby constituting the connected-electrode-plate-group body 23.

A plurality of connection protrusions 24 are formed at proper intervals in a lengthwise (up/down) direction on the collector 10. The electrode plate groups 8 are joined to each other at welding parts 25 formed by irradiating electron beam or laser beam on side edges of the connection protrusions 24 while the connection protrusions 24 are abutting against each other, thereby constituting the connected-electrode-plate-group body 23.

Figure 2:
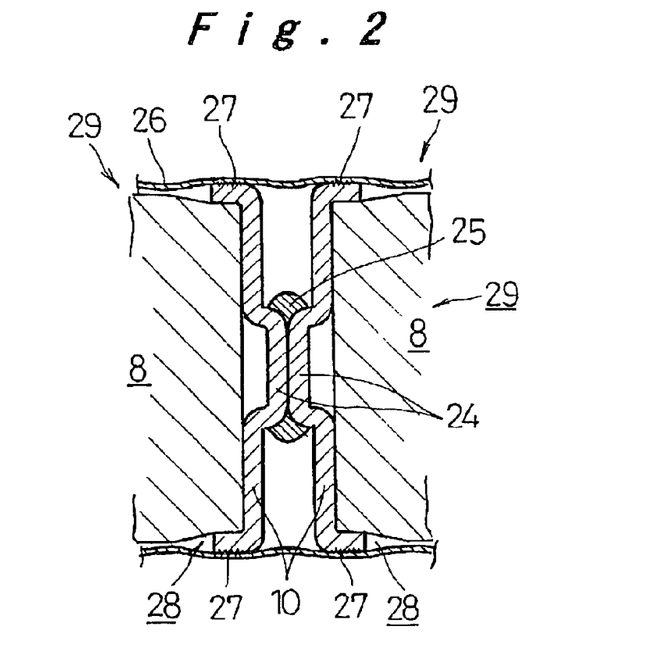
FIG. 2 is a transverse sectional view of a principal part of the prismatic sealed battery module according to the first embodiment.

The connected-electrode-plate-group body 23 is adhered to a sheet 26 with a U-shape section while three peripheral surfaces including both the side surfaces and the bottom surface are covered with the sheet 26. Simultaneously, gaps between three edges including both the side edges and the bottom edge of the individual collectors 10, and the sheet 26 are securely sealed by an adhesive material 27 as shown in FIG. 1 and FIG. 2. The sheet 26 has a polypropylene or polyethylene single-layer or laminated-multi-layer structure. As a result, the collectors 10 on both the sides of the electrode plate group 8, and the sheet 26 constitute a battery case 28 for the single cell storing each individual electrode plate group 8. After the connected-electrode-plate-group body 23 is inserted and then placed in the storage space 22 of the prismatic battery case 21 while the individual battery cases 28 are constituted, predetermined amount of electrolyte is filled in the individual battery cases 28. Then, the cover 6 is adhered to join to top edges of the prismatic battery case 21, the collectors 10 in the individual battery cases 28, and the sheet 26. As a result, the prismatic sealed battery module 1 including the internally connected a plurality of cells 29 is constituted.

With the constitution described above, since the connected-electrode-plate-group body 23 is constituted such that the electrode plate groups 8 serving as a power generation element for the individual cell are connected with each other through the collectors 10 and the leads on both the sides of the electrode plate group 8, the current-carrying paths between the cells 29 are short and straight, whereby the internal resistance decreases. As a result, the internal resistance per cell 29 is further reduced accordingly, resulting in increasing the output.

In addition, since the battery case 28 for the individual cell 29 is formed by the sheet 26 with the U-shape section and the collectors 10 provided independently to the prismatic battery case 21, it is possible to secure electrolyte seal between the individual battery cases 28 even when the side walls of the prismatic battery case 21 move due to expansion and contraction of the individual cells 29.

Figure 3:
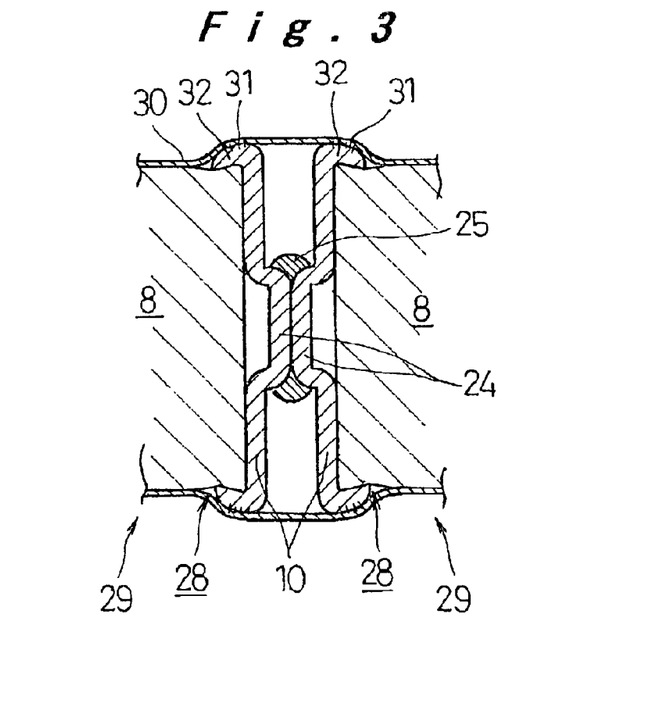
FIG. 3 is a transverse sectional view of a variation of the principal part of the prismatic sealed battery module according to the embodiment.

The description above shows the example where the battery case 28 is constituted such that the sheet 26 is adhered to the peripheral edges of the collector 10 with the adhesive material 27. However, as shown in FIG. 3, a bag-shape sheet 30, which is made of a heat-shrinkable sheet, and has a U-shape section, and whose both ends are closed, may be used in place of the sheet 26, and this bag-shape sheet 30 may be heat-shrunk while it is covering the connected-electrode-plate-group body 23. In addition, applying a seal material 31 such as pitch to both the side edges and the bottom edge of the collector 10 secures seal with higher reliability. Certainly, the seal material 31 may have adhesiveness. For increasing the capability of sealing to the bag-shape sheet 30, it is more preferable to constitute both the side edges and the bottom edge of the collector 10 as smooth curved surfaces 32.

With this constitution, the seal is conducted by bringing the bag-shape sheet 30 in close contact with both the side edges and the bottom edge of the collector 10. Thus, the battery case 28 is easily constituted at high workability by the collectors 10 on both the sides of the individual electrode plate group 8 and the bag-shape sheet 30. The material of the bag-shape sheet 30 is not limited to a heat-shrinkable material, but a material which shrinks when ultraviolet ray is irradiated may be used.

Figure 4:
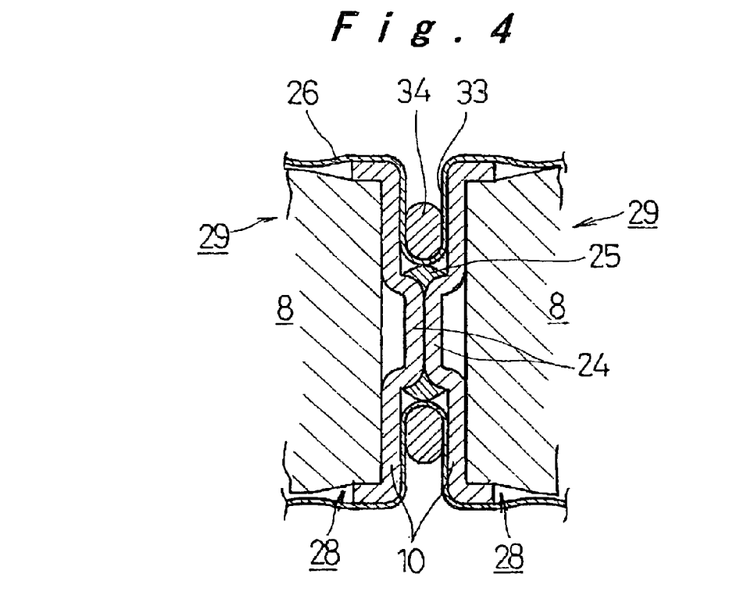
FIG. 4 is a transverse sectional view of another variation of the principal part of the prismatic sealed battery module according to the embodiment.

As shown in FIG. 4, the battery case 28 for storing the individual electrode plate group 8 may be constituted by the collectors 10 on both the sides of the electrode plate group 8 and the sheet 26 wherein an insert 33 which has a U-shape section, and is inserted into the gap between the collectors 10 is provided on the sheet 26, and an elastic pressing member 34 is inserted inside the insert 33. With this constitution, since the elastic pressing member 34 brings the sheet 26 in pressure contact with the surfaces of the collectors 10 opposing to each other so as to generate a predetermined seal surface pressure, the electrolyte seal for the individual battery cases 28 is secured by a double seal. Further, when a seal material is provided between the sheet 26 and the collector 10 at the position sealed by the pressure of the elastic pressing member 34, higher seal capability is secured.

(Second Embodiment)

Figure 5:
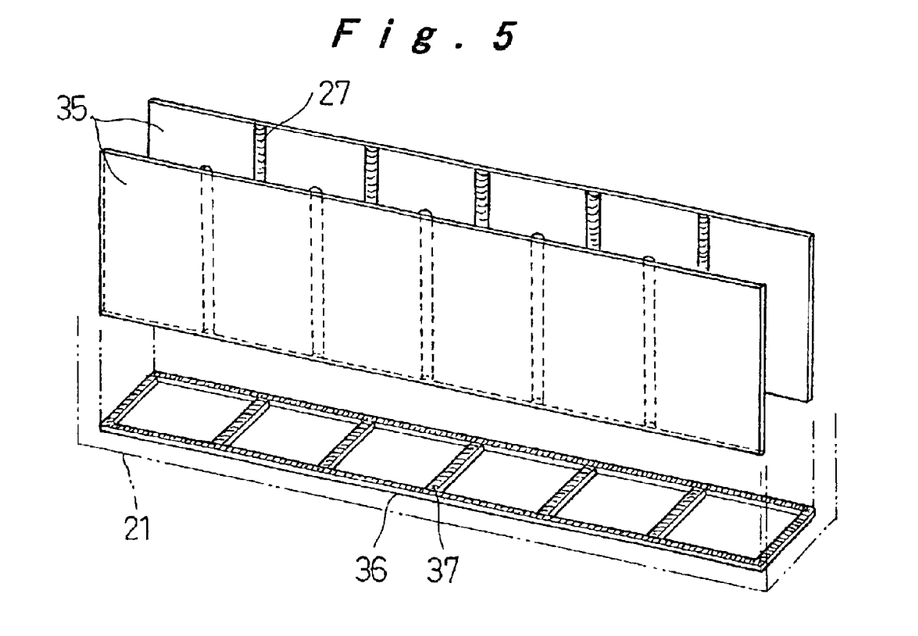
FIG. 5 is an exploded perspective view of a seal constitution of a battery case in a prismatic sealed battery module according to a second embodiment of the invention.

A second embodiment of the prismatic sealed battery module of the present invention will be described referring to FIG. 5. In the following description, the same reference numerals are assigned to constitution elements the same as those in the previous embodiment, and description is not provided for them, but is provided only for the difference.

In the present embodiment, a pair of sheets 35 whose entire shape is a rectangle cover both the sides of the connected-electrode-plate-group body 23, and simultaneously gaps between these rectangular sheets 35 and both the side edges of the collectors 10 on both the sides of the electrode plate group 8 are sealed by adhesion of the adhesive material 27. Seal grooves 36 are formed on the inner bottom surface of the prismatic battery case 21 along lines with which the bottom edges of the collectors 10 and the bottom edges of the rectangular sheets 35 come in contact. Then, a seal material 37 such as pitch is filled in the seal grooves 36.

Consequently, when the connected-electrode-plate-group body 23 to which the pair of rectangular sheets 35 are adhered is inserted and then placed in the prismatic battery case 21, the bottom edges of the collectors 10 and the bottom edges of the rectangular sheets 35 are sealed to the inner bottom surface of the prismatic battery case 21. Thus, the collectors 10 on both the sides of the electrode plate group 8, the pair of rectangular sheets 35, and the inner bottom surface of the prismatic battery case 21 constitute the battery cases 28 for storing the individual electrode plate groups 8. According to the present embodiment, the simple constitution using the inexpensive seal secures the electrolyte sheet of the individual battery cases 28.

(Third Embodiment)

A third embodiment of the prismatic sealed battery module of the invention will be described referring to FIG. 6 to FIG. 8.

Figure 6:
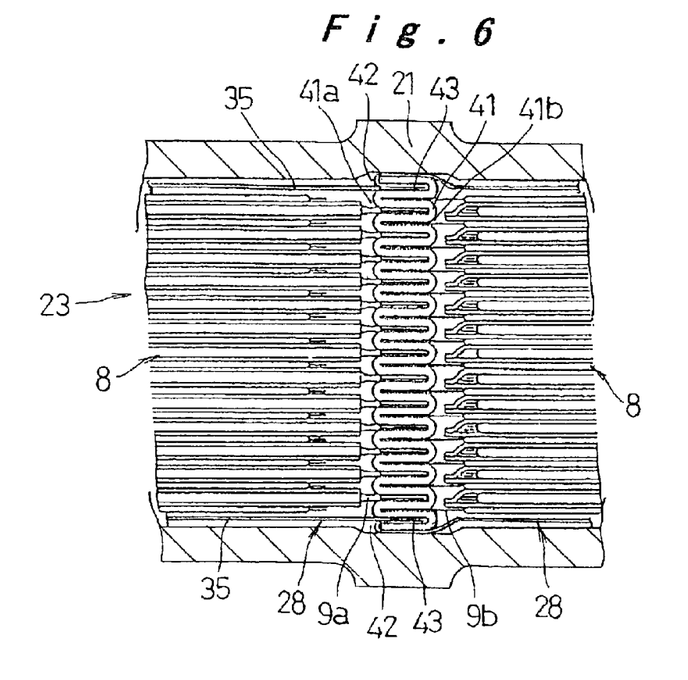
FIG. 6 is a transverse sectional view of a principal part of a prismatic sealed battery module according to a third embodiment of the invention.
Figure 7:
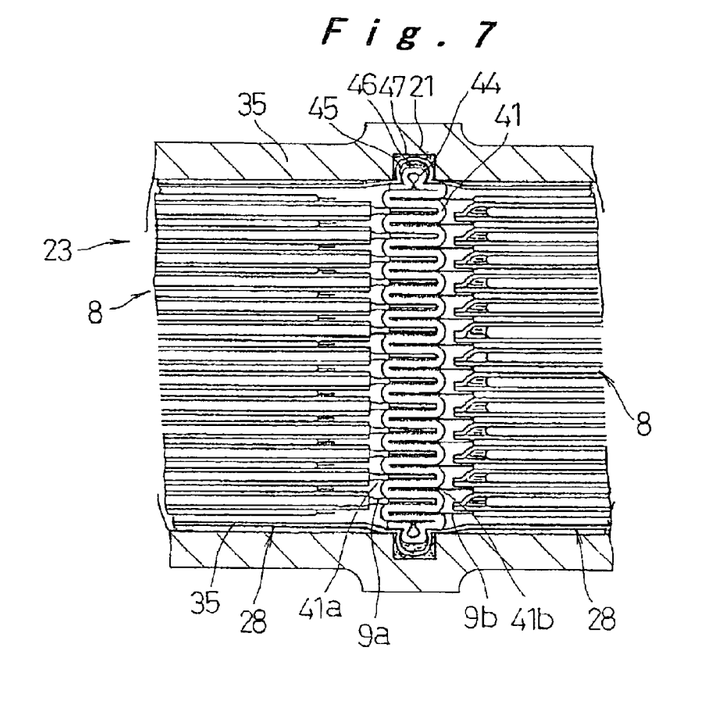
FIG. 7 is a transverse sectional view of a variation of the principal part of the prismatic sealed battery module according to the third embodiment.

In the prismatic sealed battery module 1 of the present embodiment, as shown FIG. 6, collectors for connecting the electrode plate groups 8 with each other are constituted as corrugated collector 41 formed by folding into waveform. The connected-electrode-plate-group body 23 is constituted such that leads 9a and 9b of the electrode plate groups 8 are inserted into and connected with individual waveform foldback recesses 41a and 41b. Fold-back tongues 43 are formed at positions opposing to the corrugated collectors 41 on the pair of rectangular sheets 35 covering both the sides of the connected-electrode-plate-group body 23. These fold-back tongues 43 are inserted into end-fold-back recesses 42 formed on both the ends of the corrugated collector 41, and thus, gaps between the rectangular sheets 35 and both the side edges of the corrugated collectors 41 are sealed. The bottom edges of the rectangular sheets 35 and the bottom edges of the corrugated collectors 41 are sealed by the seal material filled in the seal grooves formed on the inner bottom surface of the prismatic battery case 21 as in the embodiment described above.

In the present embodiment, since the corrugated collectors 41 between electrode plate groups 8, the pair of rectangular sheets 35, and the inner bottom surface of the prismatic battery case 21 constitute the battery case 28 for storing the individual electrode plate group 8, the simple constitution using the inexpensive rectangular sheets 35 secures the electrolyte seal of the individual battery cases 28.

The constitution example in FIG. 6 shows an example where the battery case 28 is sealed by inserting the fold-back tongue 43 of the rectangular sheet 35 into the end-fold-back recess 42 of the corrugated collector 41. However, in an example shown in FIG. 7, the battery case 28 is sealed such that after engagement protrusions 44 are formed on both the ends of the corrugated collector 41, and engagement recesses 45 to be engaged with these engagement protrusions 44 are formed on the rectangular sheets 35, both of them are engaged with each other, and then a seal material 46 such as pitch are filled into the gaps between them. To the contrary, the engagement protrusion 44 may be provided on the rectangular sheet 35, and the engagement recess 45 may be provided on the corrugated collector 41. In the example shown in the drawing, a lengthwise groove 47 for fitting in the engagement recess 45 of the rectangular sheet 35 is formed on the prismatic battery case 21 so as to prevent interference of the engagement recess 45 with the side wall of the prismatic battery case 21.

Similarly in this constitution, since the battery case 28 for storing the individual electrode plate group 8 is constituted by the corrugated collectors 41, the pair of rectangular sheets 35, and the inner bottom surface of the prismatic battery case 21, the simple constitution using the inexpensive rectangular sheets 35 secures the electrolyte seal of the individual battery cases 28.

Figure 8A:
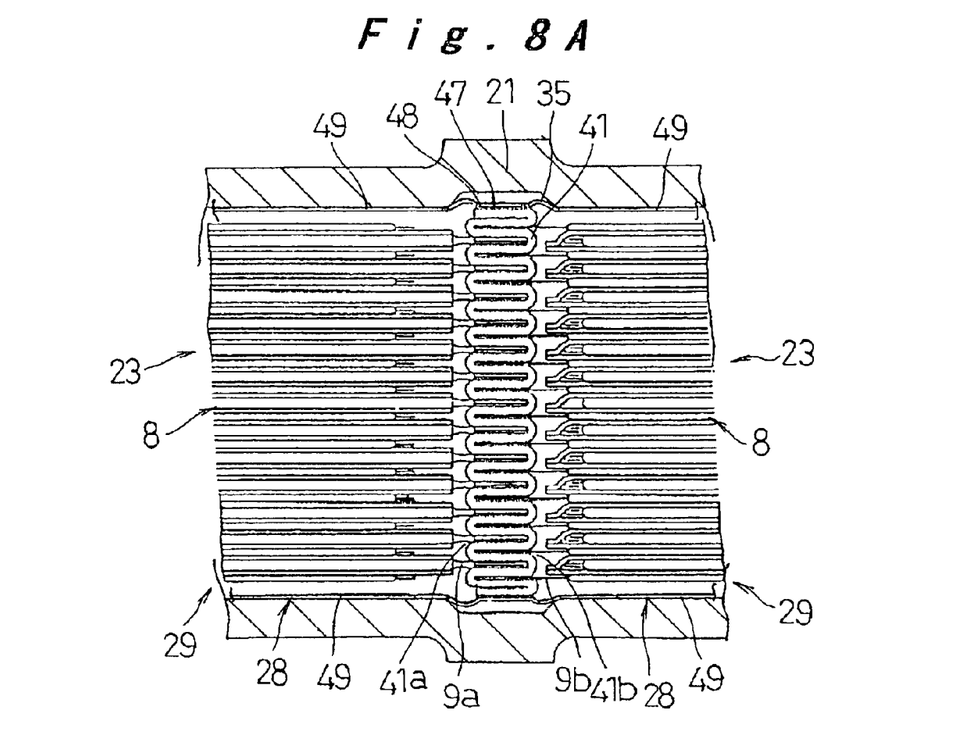
Figure 8B:
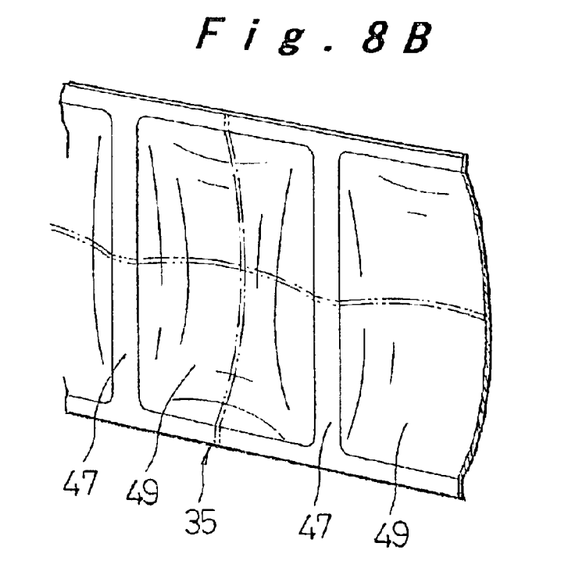

Also, as shown in FIG. 8A and FIG. 8B, a gap between a plane 47 at positions opposing to the corrugated collector 41 on the pair of rectangular sheets 35, and the corrugated collector 41 may be sealed by a seal material 48, and a part between the planes 47 on the rectangular sheet 35 may be formed so as to swell outward as shown in FIG. 8B. Thus, it may have a plate spring structure 49 elastically in pressure contact with the side wall of the prismatic battery case 21.

With this constitution, the plate spring structure 49 brings the planes 47 on the pair of rectangular sheets 35 in pressure contact with both of the side edges of the collector 41. Thus, since the corrugated collectors 41 and the rectangular sheets 35 are sealed together through the seal material 48, it is possible to secure the electrolyte seal between the individual battery cases even when the side walls of the prismatic battery case 21 move due to expansion and contraction of the individual cells 29.

(Fourth Embodiment)

A fourth embodiment of the prismatic sealed battery module of the invention will be described referring to FIG. 9. In the present embodiment, a part on the prismatic battery case 21 corresponding to the installation position of the corrugated collector 41 is formed as a support pillar 51 which has high flexural strength. At the same time, flexible thin parts 52 are provided on both the sides of the support pillar 51, and thus the part between the flexible thin parts 52 serves as a movable side wall 53. As a result, the support pillar 51 maintains its position when the movable side wall 53 is moved by expansion and contraction of the individual cell 29. In addition, the gaps between the pair of rectangular sheets 35 covering both the sides of the connected-electrode-plate-group body 23, and both the side edges of the corrugated collector 41 are sealed by the seal material 48, thereby constituting the battery case 28 for storing the individual electrode plate group 8.

Figure 9:
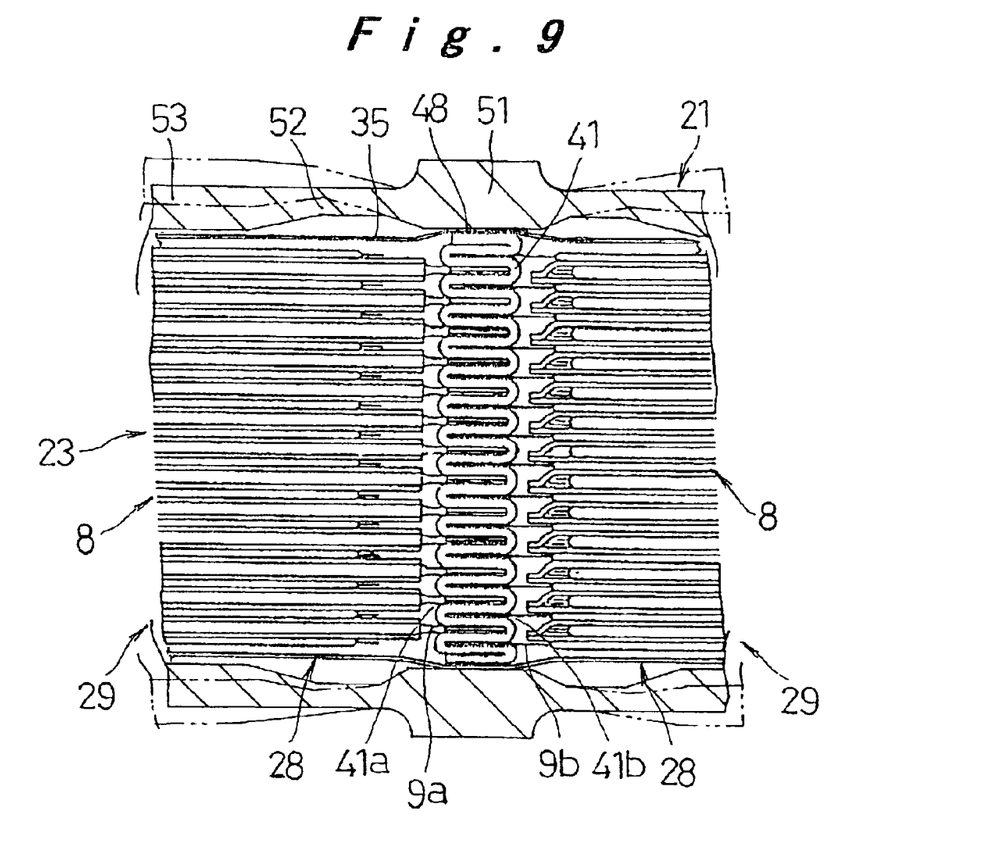
FIG. 9 is a transverse sectional view of a principal part of a prismatic sealed battery module according to a fourth embodiment of the invention.

In the present embodiment, when the movable side wall 53 of the prismatic battery case 21 moves as a result of the contraction and expansion of the individual cells 29, deformation of the flexible thin part 52 absorbs the movement as a virtual line shows in FIG. 9. Thus, the seal by the seal material 48 between the rectangular sheets 35 supported between the support pillars 51, and both the side edges of the corrugated collector 41 is not adversely affected, and the simple constitution using the inexpensive rectangular sheets 35 secures the electrolyte seal of the individual battery cases 28.

With the prismatic sealed battery module of the present invention, since the connected-electrode-plate-group body is constituted by connecting the electrode plate groups serving as the power generation element of the individual cells through the leads and the collectors on both the sides, the current-carrying paths between the cells are short and straight, and thus the internal resistance is reduced. As a result, the internal resistance per cell is reduced further accordingly, resulting in increasing the output. In addition, since the battery case for the cell is formed by the sheet and the collectors provided independently to the prismatic battery case, it is possible to secure electrolyte seal between the individual battery cases even when the side walls of the prismatic battery case move due to expansion and contraction of the individual cells.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic sealed battery module comprising:
   a plurality of electrode plate groups each formed by laminating a positive electrode plate and a negative electrode plate with a separator interposed between them, said electrode plate group including leads protruding respectively from one side of the positive electrode plate and the negative electrode plate in directions opposite to each other;
   collectors joined to the leads on both sides of the electrode plate group; and
   a prismatic battery case for storing the plurality of electrode plate groups, wherein
   a connected-electrode-plate-group body is constituted by connecting the plurality of electrode plate groups with each other through the collectors interposed between them,
   the connected-electrode-plate-group body is placed in the prismatic battery case while a sheet covering at least two side surfaces of peripheral surfaces of the connected-electrode-plate-group body is provided, and gaps between the sheet and outer edges of the collectors are sealed, and
   gaps between the outer edges of the collectors which are not sealed to the sheet, and the inner surfaces of the prismatic battery case are sealed.

2. The prismatic sealed battery module according to claim 1, wherein the connected-electrode-plate-group body is constituted by connecting the collectors with each other.

3. The prismatic sealed battery module according to claim 1, wherein the collector is a corrugated collector formed by folding the collector into waveform, and the connected-electrode-plate-group body is constituted such that the leads are inserted into and connected with individual waveform fold-back recesses.

4. The prismatic sealed battery module according to claim 1, wherein the sheet has a U-shape section covering three side surfaces of the peripheral surfaces of the connected-electrode-plate-group body, gaps between three outer edges of the collector, and the sheet are sealed with an adhesive material, and a battery case for storing the individual electrode plate group is constituted by the collectors on both the sides of the electrode plate group, and the sheet.

5. The prismatic sealed battery module according to claim 1, wherein the sheet is a shrinkable sheet and has a bag shape for covering the connected-electrode-plate-group-body, the sheet is shrunk for sealing while a seal material is interposed between three outer edges of the collector and the sheet, and a battery case for storing the individual electrode plate group is constituted by the collectors on both the sides of the electrode plate group and the sheet.

6. The prismatic sealed battery module according to claim 2, wherein an insert with a U-shape section to be inserted into a gap between the collectors is provided on the sheet, an elastic pressing member is pressed into the inside of the insert, and a battery case for storing the individual electrode plate group is constituted by the collectors on both the sides of the electrode plate group and the sheet.

7. The prismatic sealed battery module according to claim 1, wherein the sheet comprises a pair of rectangular sheets covering both sides of the connected-electrode-plate-group body, gaps between the sheet and both side edges of the collector are sealed with an adhesive material, the sheet and a bottom edge of the collector are sealed with a seal material filled in a seal groove formed on an inner bottom surface of the prismatic battery case, and a battery case for storing the individual electrode plate group is constituted by the collectors on both the sides of the electrode plate group, the pair of sheets, and the inner bottom surface of the prismatic battery case consequently.

8. The prismatic sealed battery module according to claim 3, wherein the sheet comprises a pair of rectangular sheets covering both sides of the connected-electrode-plate-group body, gaps between the sheet and both side edges of the collector are sealed by inserting parts of the sheet opposing to the waveform fold-back recesses on the ends of the corrugated collector into these fold-back recesses, the sheet and a bottom edge of the collector are sealed with a seal material filled in a seal groove formed on an inner bottom surface of the prismatic battery case, and a battery case for storing the individual electrode plate group is constituted by the collectors on both the sides of the electrode plate group, the pair of sheets, and the inner bottom surface of the prismatic battery case consequently.

9. The prismatic sealed battery module according to claim 3, wherein the sheet comprises a pair of rectangular sheets covering both sides of the connected-electrode-plate-group body, gaps between the sheet and both side edges of the collector are sealed with a seal material while side edges of the corrugated collector are engaged with engaging parts provided on the sheets at parts opposing to the corrugated collector, the sheet and a bottom edge of the collector are sealed with a seal material filled in a seal groove formed on an inner bottom surface of the prismatic battery case, and a battery case for storing the individual electrode plate group is constituted by the collectors on both the sides of the electrode plate group, the pair of sheets, and the inner bottom surface of the prismatic battery case consequently.

10. The prismatic sealed battery module according to claim 1, wherein the sheet comprises a pair of rectangular sheets covering both sides of the connected-electrode-plate-group body, gaps between the collector and parts on the sheet opposing to the collector are sealed with a seal material, a part of the sheet between the parts opposing to the collector has a plate spring structure to be elastically in pressure contact with the side surface of the prismatic battery case, the sheet and a bottom edge of the collector are sealed with a seal material filled in a seal groove formed on an inner bottom surface of the prismatic battery case, and a battery case for storing the individual electrode plate group is constituted by the collectors on both the sides of the electrode plate group, the pair of sheets, and the inner bottom surface of the prismatic battery case consequently.

11. The prismatic sealed battery module according to claim 1, wherein the prismatic battery case has higher flexural strength at parts corresponding to the installed positions of the collectors, and includes flexible thin parts on both the sides of the part, the sheet comprises a pair of rectangular sheets covering both sides of the connected-electrode-plate-group body, gaps between the sheet and both side edges of the collector are sealed with a seal material or an adhesive material, the sheet and a bottom edge of the collector are sealed with a seal material filled in a seal groove formed on an inner bottom surface of the prismatic battery case, and a battery case for storing the individual electrode plate group is constituted by the collectors on both the sides of the electrode plate group, the pair of sheets, and the inner bottom surface of the prismatic battery case.

* * * * *